US012762582B1

(12) United States Patent
Sabne et al.

(10) Patent No.: US 12,762,582 B1
(45) Date of Patent: Oct. 13, 2026

(54) AIRLINE SEAT BRAND IDENTIFICATION AND FARE GROUPING SYSTEM

(71) Applicants: Shitalkumar Sabne, Aldie, VA (US); Steven Botham, Plant City, FL (US); David Cyril David, Marietta, GA (US); Nicholas Alexander Gare, Brandon, FL (US)

(72) Inventors: Shitalkumar Sabne, Aldie, VA (US); Steven Botham, Plant City, FL (US); David Cyril David, Marietta, GA (US); Nicholas Alexander Gare, Brandon, FL (US)

(73) Assignee: Airlines Reporting Corporation, Arlington, VA (US)

( * ) Notice: Subject to any disclaimer, the term of this patent is extended or adjusted under 35 U.S.C. 154(b) by 0 days.

(21) Appl. No.: 19/411,482

(22) Filed: Dec. 8, 2025

(51) Int. Cl.
*G06Q 30/0201* (2023.01)
*G06Q 10/02* (2012.01)
*G06Q 50/40* (2024.01)

(52) U.S. Cl.
CPC ... *G06Q 30/02013* (2025.08); *G06Q 10/0283* (2025.08); *G06Q 50/40* (2024.01)

(58) Field of Classification Search
CPC ......... G06Q 30/02013; G06Q 10/0283; G06Q 50/40
See application file for complete search history.

(56) References Cited

U.S. PATENT DOCUMENTS

2012/0066065 A1* 3/2012 Switzer .............. G06Q 30/0255 705/1.1
2017/0178258 A1* 6/2017 Goldstein .......... G06Q 30/0631

OTHER PUBLICATIONS

Kalampokas, et al., A holistic Approach on Airfare Price Prediction Using Machine Learning Techniques 11 IEEE Access 46627 (2023) (Year: 2023).*

* cited by examiner

*Primary Examiner* — Charles Guiliano
(74) *Attorney, Agent, or Firm* — Kaufman & Canoles P.C.

(57) ABSTRACT

Systems and methods of performing airline seat brand identification and fare grouping are presented. In one exemplary embodiment, a first network node device receives ticketing data and brand reference data, determines whether an airline is a contributing or non-contributing source of brand reference data, and executes corresponding processing sequences. For contributing airlines, mapping logic assigns an airline brand and a first AI model identifies associated brand amenity attributes. For non-contributing airlines, a second AI model infers an airline brand from ticketing-related variables, and the first AI model derives corresponding brand amenity attributes. The assigned and inferred data are processed through a multidimensional clustering algorithm based on mixed numerical and categorical similarity metrics to generate benchmark groups of airline brands and a brand-based benchmarking dataset.

20 Claims, 7 Drawing Sheets

AIRLINE SEAT BRAND IDENTIFICATION AND FARE GROUPING SYSTEM

BACKGROUND

Airlines currently define and market seat products under proprietary branded fare structures, such as "Basic Economy," "Main Cabin," or "Economy Plus," each offering different amenities, refundability, and flexibility options. However, existing ticketing and fare-distribution systems-including global distribution systems (GDSs), airline reservation systems, and settlement networks-do not transmit or standardize brand identifiers as part of the fare or ticketing data exchanged between carriers, travel agencies, and settlement providers. As a result, downstream analytics platforms and benchmarking systems rely primarily on fare classes or designators, which fail to represent the true airline product or brand sold to a passenger. This lack of consistent brand-level data leads to a number of inefficiencies, including incomplete or misleading views of marketplace conditions, impediments to accurate revenue benchmarking, and limitations on the ability of airlines to evaluate how their own branded seat products are positioned and performing across different markets and customer segments.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

DETAILED DESCRIPTION

Figure 1A:
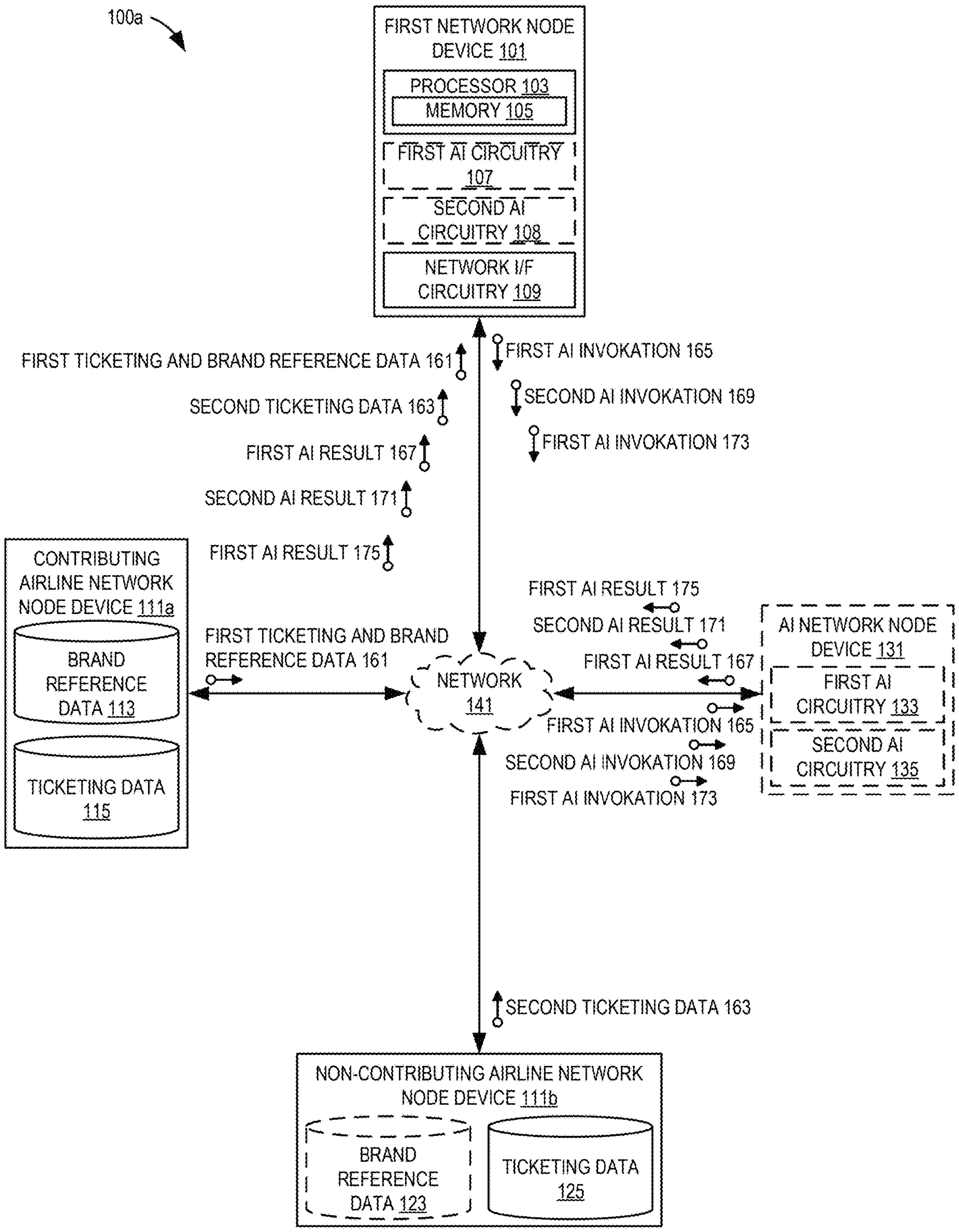
FIG. 1A illustrates one embodiment of a system of airline seat brand identification and fare grouping in accordance with various aspects as described herein.

For simplicity and illustrative purposes, the present disclosure is described by referring mainly to exemplary embodiments thereof. In the following description, numerous specific details are set forth in order to provide a thorough understanding of the present disclosure. However, it will be readily apparent to one of ordinary skill in the art that the present disclosure may be practiced without limitation to these specific details.

In the modern airline industry, each carrier defines its own branded fare structure based on seat features, passenger needs, and marketing strategy. Airlines segment their seat offerings, create fare product strategies, and determine how seat features such as baggage allowance, refundability, and flexibility align with price tiers. These fare products, often known as branded fares, may include designations such as Basic Economy, Economy Plus, Premium Economy, or Main Cabin. However, while airlines manage their brand identities internally, the brand-level information is not typically transmitted through the ticketing and settlement infrastructure used for industry clearing and payment. Standard settlement data includes fare-basis codes, ticket designators, and amounts paid, but not the specific brand or associated amenity details. This omission creates a disconnect between the actual travel product sold and the value provided to the passenger and the data that downstream systems can analyze. This omission adds to the complexity and difficulty that otherwise exists and is associated with using ticketing data to perform pricing analyses, benchmarking exercises, and other aggregate business-planning intelligence.

Existing data analysis systems for airline ticketing are limited, including because they interpret fare-basis codes as the principal indicator of product type. These codes, however, were created to manage revenue inventory rather than to represent brands. When ticketing data is grouped purely by fare class or ticket designator, dissimilar branded products across different airlines are mistakenly treated as comparable. For example, a Basic Economy fare from one airline may be grouped with a Flexible Economy fare from another if both share a similar fare class label. Airlines themselves understand their own brand hierarchies, but global datasets do not. This inconsistency results in a number of inefficiencies, including incomplete or misleading marketplace information, impediments to accurate revenue benchmarking, and limitations on the ability of airlines to evaluate the positioning and performance of their own branded seat products across different markets.

The present disclosure helps address the limitations resulting from the identified inconsistency by providing a data processing framework that identifies, standardizes, and benchmarks airline seat brands using both contributed and non-contributed sources of information. The disclosed approach allows for the integration of two primary data inputs: (1) ticketing data received from airline systems, which includes fare-basis information, carrier codes, and pricing data, and (2) brand reference data contributed by some airlines, which provides explicit mappings between ticketing attributes and the airline's branded fare tiers. By combining these two sources and supplementing missing information through artificial intelligence models, the system creates a standardized, brand-based benchmarking dataset that more accurately reflects the marketplace structure across multiple airlines. This type of neutral and comprehensive methodology eliminates inefficiencies such as the need for each airline to independently derive and maintain internal fare-brand mappings within their own systems for benchmarking and reporting. It therefore consumes fewer system resources, reduces technical debt by avoiding the maintenance of multiple redundant models, and improves computing efficiency across databases using pre-calculated information generated by the disclosed model output. As such, the present disclosure provides a technically efficient and scalable architecture for airline brand identification and benchmarking across heterogeneous data environments.

The disclosed system begins by distinguishing between contributing airlines and non-contributing airlines. Contributing airlines are those that provide brand reference data directly, including airline-contributed brand identifiers that define how ticketing data should be mapped to specific branded fare products. Non-contributing airlines, on the other hand, provide only ticketing data without brand references. The system receives these datasets over a communication network and determines which airlines have supplied brand reference data and which have not.

For airlines that provide brand reference data, the system applies mapping logic to associate each set of ticketing data with the appropriate airline brand based on the contributed brand identifiers. For example, if an airline's internal mapping indicates that fare-basis codes beginning with "YUP" correspond to a "Main Cabin Flex" product, the system uses that mapping to label those tickets accordingly. The system then applies an artificial intelligence model, referred to herein as the first AI model, that has been trained to identify and associate brand amenity attributes with each assigned airline brand. These attributes can include, for instance, whether the fare includes checked bags, whether the ticket is refundable, whether the seat is upgrade-eligible, or whether Wi-Fi or other onboard services are offered.

For airlines that do not provide brand reference data, the system executes a separate process. It generates ticketing-related variables from the available ticketing data—such as fare-basis structure, route pattern, carrier code, cabin indicator, ticket designator, or other ticketing-related attributes—and inputs these variables into a second AI model. This second AI model has been trained using deep learning to infer an airline brand identifier for non-contributing airlines by recognizing statistical patterns that correlate ticketing-related variables with labeled brand examples derived from contributing airlines or other training sources. Once the second AI model infers the brand, the system again applies the first AI model to determine the corresponding brand amenity attributes. In this way, the disclosed framework attempts to derive brand identification and amenity classification even when not all airlines provide complete brand information.

After assigning brands and identifying amenities for both contributing and non-contributing airlines, the system performs multidimensional clustering to group similar airline brands together for analytical purposes. The clustering algorithm is designed to handle mixed numerical metrics (such as fare price, average route distance, or number of included services) and categorical similarity metrics (such as amenity type, refund policy, or upgrade eligibility). This hybrid clustering process enables the creation of benchmark groups of airline brands—each representing a cluster of brands that are similar in terms of brand, amenity, and fare-related characteristics as reflected in the underlying data, with some inherent heterogeneity. For example, one benchmark group might include brands offering low fares with minimal amenities, while another might include brands that provide greater flexibility, such as options for refundability and advance seat selection.

The clustering results are then processed to generate benchmark data of airline brands, which can include statistical measures such as average fare levels, frequency distributions of amenities, and aggregated feature scores within each benchmark group. From this information, the system produces a brand-based benchmarking dataset available to the information processor that, subject to safeguards where needed, can be used by airlines, travel agencies, and analytics providers to support internal analysis, reporting, and customer-facing decision-support tools regarding branded seat products. This dataset captures both quantitative and qualitative aspects of each brand's fare offering, providing an improved representation of how airline products are structured and described across different branded fare categories.

The overall effect of the disclosed approach is to transform incomplete ticketing data into a more comprehensive, brand-enriched analytical resource. By incorporating contributed brand mappings, inferring missing brand identities through deep learning, and enriching those identities with generative amenity data, the system enables improved and dynamic benchmarking of heterogenous airline products at the brand level. This view provides airlines with an improved view into the relative characteristics and performance of their own branded seat products based on standardized brand and amenity information, supporting internal planning, reporting, and customer-facing decision-support tools.

The present disclosure is not used to set, recommend, or coordinate prices between airlines, but rather to process and analyze fare and brand information that is already publicly available or accessible through existing distribution, settlement, or reporting channels. For example, ticketing data and fare information used as inputs to the disclosed system may be obtained from post-transaction settlement flows, industry clearing systems, or publicly accessible booking and comparison channels that already expose airline seat offerings, branded fare tiers, and associated prices to consumers and third parties. The disclosed processing framework operates on such data as a downstream analytical layer and does not require participating airlines to exchange forward-looking pricing intentions or other undisclosed competitive strategies through the system.

In some embodiments, the brand-based benchmarking dataset produced by the disclosed system may be generated in an aggregated or anonymized form that does not identify carrier-specific pricing information in a manner that provides greater granularity or timeliness than is already observable through existing consumer-facing sales channels. For example, the system may compute normalized fare indices, average brand-level prices, or amenity-based value scores across groups of airlines or market segments rather than exposing raw, carrier-by-carrier pricing strategies in real time. A network node device (e.g., server) and associated processing circuitry may be configured to apply aggregation thresholds, time delays, or data suppression rules when generating benchmarking outputs, enabling airlines and other stakeholders to evaluate the characteristics, aggregate pricing patterns, and amenity profiles of branded seat products using pre-calculated analytical metrics derived from existing data.

In this regard, the disclosed framework can be implemented as an independent analytical service that passively receives ticketing data and brand reference data from multiple sources, transforms that data using the first and second AI models and the multidimensional clustering algorithm, and returns standardized benchmarking metrics for internal analysis, reporting, and customer-facing decision-support tools without providing any functionality for negotiating or communicating pricing, capacity, or other sensitive decisions among carriers. Each airline independently will continue to determine its own seat brands, fare structures, and commercial strategies using its internal systems, and may elect to consume the brand-based benchmarking dataset solely as one of many informational inputs into those independently made decisions without any requirement to align its decisions with other carriers using the service.

FIG. 1A illustrates one embodiment of a system 100*a* for airline ancillary services data collection and benchmarking in accordance with various aspects as described herein. In FIG. 1A, the system 100*a* can include a first network node device 101 communicatively coupled, via a network 141 (e.g., the Internet, a wide-area network (WAN), or a secure enterprise network), to a set of airline network node devices 111*a,b* and to an AI network node device 131. The set of airline network node devices 111*a,b* can include a contributing airline network node device 111*a* and a non-contributing airline network node device 111*b*, each corresponding to a respective airline of a participating airlines cohort. As used herein, an airline network node device broadly encompasses any airline operated or authorized computing system configured to exchange ticketing and brand reference data, including a host reservation system, pricing engine, or data distribution interface, whether on-premises or cloud-based.

Each airline network node device 111*a,b* can represent computing infrastructure associated with a participating airline—such as a reservation or inventory management server—that is configured to transmit data describing airline fare products. The data transmitted from each airline network node device 111*a,b* may include ticketing data and/or brand reference data. The term ticketing data can refer to structured records that describe fare-related information for issued or filed tickets, including fare-basis information, routing identifiers, booking-class codes, cabin designators, or ancillary attributes. The term brand reference data can refer to airline-supplied brand definitions or identifiers that explicitly associate a fare or product with a branded fare family. Such airline-contributed brand identifiers may correspond, for example, to product tiers such as "Economy Basic," "Economy Flex," "Business Saver," or "First Deluxe," or to internal airline brand codes registered in the airline's distribution system.

The first network node device 101 can include processing circuitry 103 operatively coupled to memory 105 and network interface circuitry 109. The processing circuitry 103 can be configured to execute computer-readable instructions stored in the memory 105 to perform the operations described herein, including obtaining airline data, determining contributing or non-contributing status, invoking remote AI processing, and generating benchmark datasets. The network interface circuitry 109 can enable bidirectional communication with remote devices over the network 141 using standardized transport protocols such as HTTPS or secure message queues.

The contributing airline network node device 111*a* can store brand reference data 113 and ticketing data 115, both associated with the corresponding airline. The brand reference data 113 may include the airline-contributed brand identifiers defining branded fare products, while the ticketing data 115 may include fare-basis information such as "Y26NR," "QFLEX," or "BUSADV" codes that indicate cabin and flexibility levels. The non-contributing airline network node device 111*b* can include brand reference data 123 (which may be incomplete or absent) and ticketing data 125, both associated with that airline.

The AI network node device 131 can include first AI circuitry 133 operable to execute a first AI model, or second AI circuitry 135 operable to execute a second AI model. The term AI model refers to a machine-learning or AI framework trained on airline or travel commerce datasets to perform a defined inferential function. The first AI model may be a generative or semantic embedding model trained to identify and associate brand amenity attributes—for example, baggage allowance, refundability, seat-selection capability, upgrade eligibility, and change-fee flexibility—with a given airline brand. The second AI model may be a deep-learning or neural-network model trained to infer an airline brand from derived ticketing-related variables such as fare-basis patterns, cabin indicators, route characteristics, carrier codes, or ticket designators when brand reference data is unavailable.

During operation, a sequence of data exchanges occurs between these devices, represented by indications 161-175. In one embodiment, the first network node device 101 can receive, via the network interface circuitry 109 over the network 141, from the contributing airline network node device 111*a*, an indication 161 that includes first ticketing data and first brand reference data corresponding to the contributing airline. The first network node device 101 can process the received indication 161 to determine that the source airline is a contributing airline that provides brand reference data. In another embodiment, the first network node device 101 can receive, via the network interface circuitry 109 over the network 141, from the non-contributing airline network node device 111*b*, an indication 163 that includes second ticketing data corresponding to the non-contributing airline but lacking brand reference data.

Responsive to determining that the certain airline is the contributing airline, the first network node device 101 can execute a first processing sequence. In this sequence, the processing circuitry 103 can apply mapping logic—for example, a set of deterministic or rule-based transformations that map airline-specific fare codes to standardized brand categories—to assign an airline brand to the first ticketing data 115. Mapping logic as used herein can include deterministic lookup tables, rules-based transformations, or machine-learned associations that map airline-specific fare codes or ticketing parameters to standardized brand identifiers. The first network node device 101 can then transmit, via the network interface circuitry 109 over the network 141, to the AI network node device 131, a first AI invocation indication 165 including the assigned airline brand. The first AI circuitry 133 can execute the first AI model to identify and associate brand amenity attributes with the assigned airline brand and can return, via the network 141, to the first network node device 101, a first AI result indication 167 including a set of brand amenity attributes associated with the assigned airline brand.

Responsive to determining that the certain airline is a non-contributing airline, the first network node device 101 can execute a second processing sequence. The processing circuitry 103 can generate a set of ticketing-related variables from the second ticketing data 125 and can transmit, via the network interface circuitry 109, a second AI invocation indication 169 to the AI network node device 131. The second AI circuitry 135 can execute the second AI model to infer an airline brand from the set of ticketing-related variables and can return, via the network 141, to the first network node device 101, a second AI result indication 167 including the inferred airline brand. The first network node device 101 can then transmit, via the network interface circuitry 109 over the network 141, to the AI network node device 131, a first AI invocation indication 173 including the inferred airline brand. The first AI circuitry 133 can execute the first AI model to identify and associate brand amenity attributes with the inferred airline brand and can return, via the network 141, to the first network node device 101, a first AI result indication 175 including a set of brand amenity attributes associated with the inferred airline brand.

After obtaining brand amenity attributes associated with the assigned and inferred airline brands from the respective processing sequences, the first network node device 101 can process this information through a multidimensional clustering algorithm that groups airlines based on similarity of fare and amenity characteristics. The clustering algorithm may employ mixed numerical metrics (e.g., Euclidean or Manhattan distance on continuous amenity-value variables such as average fare price or baggage weight limit) and categorical similarity metrics (e.g., Jaccard or Hamming similarity on categorical attributes such as refund policy type or seat category). These metrics may be jointly applied within a hybrid clustering framework such as a k-prototype algorithm to yield benchmark groups of airline brands—each group representing airlines with statistically similar fare product and amenity profiles—and corresponding benchmark data of airline brands, which may include average amenity scores, normalized fare indices, or ranking values.

The resulting outputs can be stored in the memory 105 and may be aggregated to produce a brand-based benchmarking dataset that unifies results across all airlines in the participating cohort. The brand-based benchmarking dataset may include, for example, structured data tables indicating, for each airline brand, its benchmark group assignment, relative position score, and average fare-to-amenity ratio. This dataset can be transmitted, via the network interface circuitry 109, to downstream analytical systems, visualization dashboards, or reporting applications for use in internal analysis, reporting, and customer-facing decision-support tools regarding branded seat products.

Figure 5:
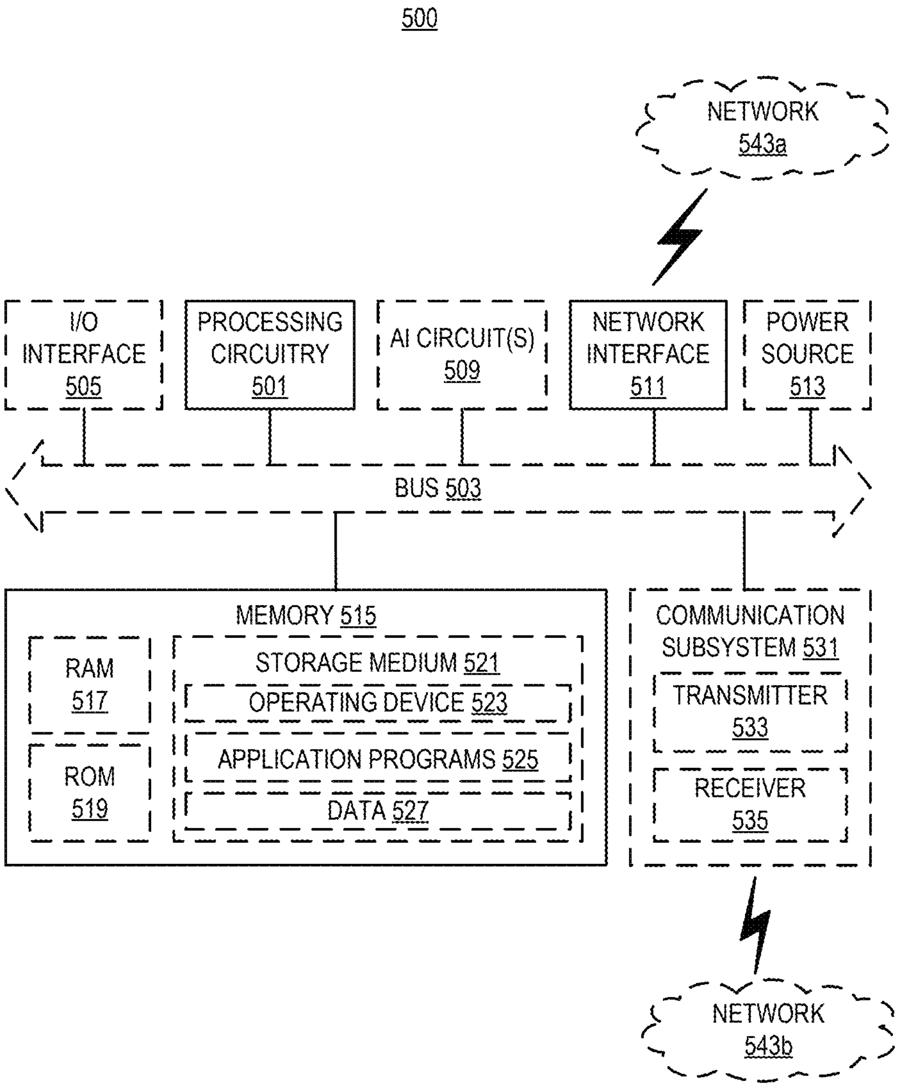
FIG. 5 illustrates another embodiment of a network node device in accordance with various aspects as described herein.

Various embodiments may execute the first and second AI models locally within the first network node device 101, remotely via the AI network node device 131, or cooperatively across distributed AI circuitry instances as shown in FIG. 1A and FIG. 5.

In other exemplary embodiments, the functions of the first AI model and the second AI model may be distributed between the first network node device 101 and the AI network node device 131 in various configurations. Each configuration provides flexibility for implementation depending on system architecture, processing load, latency requirements, or data sovereignty constraints. The AI models described herein may be executed by first AI circuitry configured to perform the first AI model trained to identify and associate brand amenity attributes with an assigned or inferred airline brand, and second AI circuitry configured to perform the second AI model trained to infer airline brands based on ticketing-related variables.

In one exemplary embodiment, both the first AI circuitry 107 and the second AI circuitry 108 can be integrated within the first network node device 101. In this configuration, the first network node device performs both AI processes locally. The processing circuitry 103 of the first network node device 101 can invoke the first AI circuitry 107 to execute the first AI model for determining brand amenity attributes associated with an airline brand, and can invoke the second AI circuitry 108 to execute the second AI model to infer airline brands from ticketing-related variables when brand reference data is unavailable. The network interface circuitry 109 in this embodiment can be primarily used to receive ticketing data and brand reference data from the airline network node devices and to output the resulting brand-based benchmarking dataset, thereby minimizing external AI processing dependencies. The brand-based benchmarking dataset may include, for example, normalized fare indices, aggregated amenity value scores, or ranked benchmark identifiers stored in tabular, JSON, or relational database format for external consumption.

In another exemplary embodiment, the first AI circuitry 107 and the second AI circuitry 108 can be instead located remotely in the AI network node device 131 as respective first AI circuitry 133 and second AI circuitry 135. In this fully distributed configuration, the first network node device 101 can transmit the relevant ticketing data and ticketing-related variables to the AI network node device 131 via the network 141. The AI network node device 131 can execute the first and second AI models using its respective circuitry 133 and 135 and can transmit the resulting brand amenity attributes and inferred airline brands back to the first network node device 101. This embodiment enables centralized AI processing for multiple client systems, facilitating model maintenance, version control, and computational scalability in a cloud-based or data-center deployment.

In yet another exemplary embodiment, the first AI circuitry 107 of the first network node device 101 can execute the first AI model, while the second AI circuitry 135 of the AI network node device 131 can execute the second AI model. In this hybrid configuration, the inference of airline brands from ticketing-related variables is offloaded to the AI network node device 131, while the generation of brand amenity attributes remains local to the first network node device 101. Such an arrangement allows computationally intensive deep learning brand inference to be performed by the AI network node device 131, which may contain specialized neural network accelerators or tensor processing units, while the first network node device 101 can execute the generative model that maps identified brands to their corresponding amenity attributes. The resulting outputs are combined locally before proceeding to multidimensional clustering and benchmarking.

In another exemplary embodiment, the first AI circuitry 133 of the AI network node device 131 can execute the first AI model, while the second AI circuitry 108 of the first network node device 101 can execute the second AI model. This configuration reverses the distribution described above. Here, the first network node device 101 can perform local inference of airline brands from ticketing-related variables using its internal second AI circuitry 108, and can then send the inferred brands to the AI network node device 131. The AI network node device 131, through its first AI circuitry 133, can execute the generative model to determine the corresponding brand amenity attributes. The resulting enriched brand-amenity data can be transmitted back to the first network node device 101 for subsequent clustering and benchmarking. This configuration reduces network traffic associated with transmitting large ticketing datasets while still leveraging remote AI resources for high-quality amenity analysis.

In another exemplary embodiment, the first AI circuitry 107 of the first network node device 101 and the first AI circuitry 133 of the AI network node device 131 can operate cooperatively to execute different stages of the first AI model. For instance, the first AI circuitry 107 may perform feature extraction or preprocessing on the ticketing data, while the first AI circuitry 133 can perform the generative inference of brand amenity attributes. Similarly, the second AI circuitry 108 and 135 may cooperate to execute different stages of the second AI model, such as distributed feature encoding at the first network node device 101 and deep layer inference at the AI network node device 131. This distributed-execution approach provides dynamic load balancing and allows incremental model updates across networked AI resources.

In another exemplary embodiment, the AI network node device 131 can function as an adaptive AI processing hub configured to selectively execute either or both AI models based on current resource conditions. For example, the first network node device 101 may initially invoke its internal AI circuitry 107 to perform the first AI model, but, when encountering large data volumes or latency constraints, may redirect execution of that model to the first AI circuitry 133 of the AI network node device 131. Similarly, execution of the second AI model may be dynamically reassigned between the local second AI circuitry 108 and the remote second AI circuitry 135 depending on computational availability, data size, or network bandwidth. This embodiment enables adaptive workload distribution for real-time or large-scale airline data environments.

In each of these embodiments, the resulting output from the AI circuitry—whether local, remote, or hybrid—is processed by the first network node device 101 through its processing circuitry 103. The processing circuitry 103 integrates the assigned and inferred airline brands and their corresponding brand amenity attributes, applies the multi-dimensional clustering algorithm using mixed numerical and categorical similarity metrics, and generates benchmark groups of airline brands and the corresponding benchmark data. The output of these processes constitutes the brand-based benchmarking dataset, which may be transmitted to external analytics systems or stored locally for further evaluation.

Figure 1B:
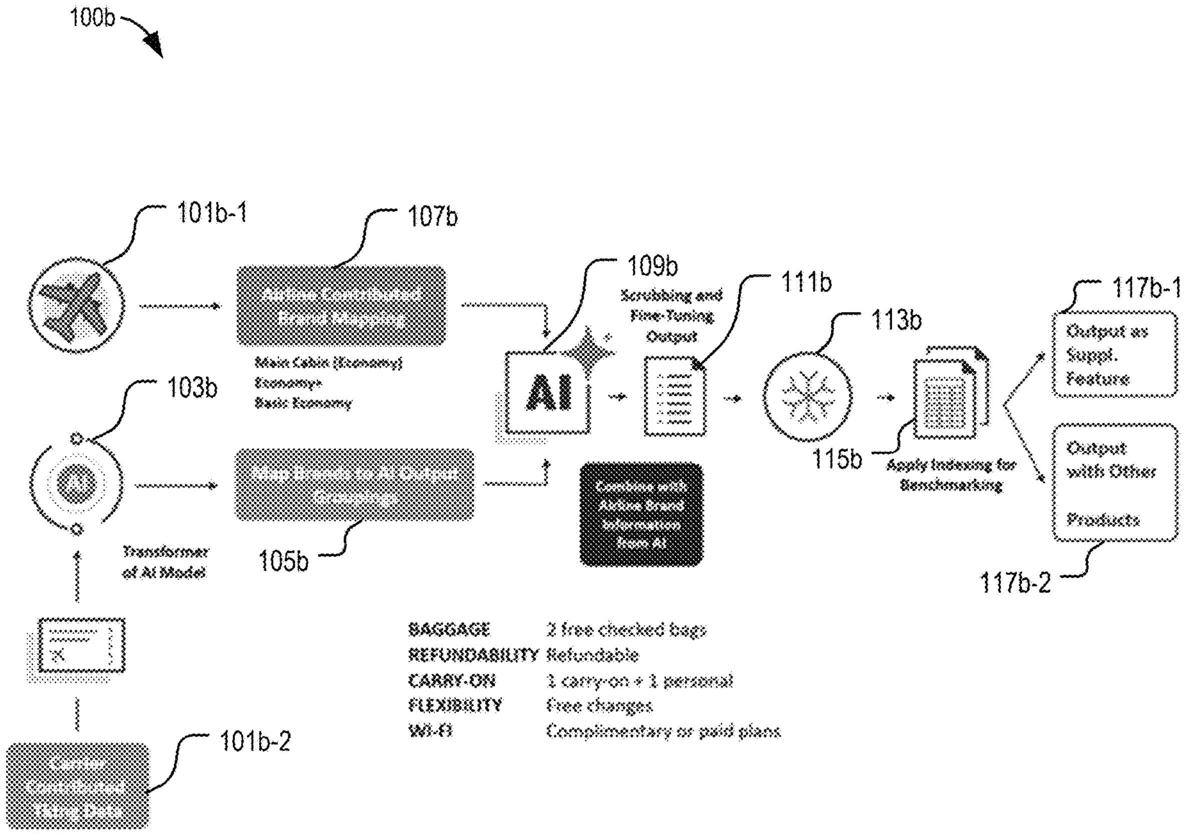
FIG. 1B illustrates another embodiment of a system of airline seat brand identification and fare grouping in accordance with various aspects as described herein.

FIG. 1B illustrates another embodiment of a system 100*c* of airline seat brand identification and fare grouping in accordance with various aspects as described herein. In FIG. 1B, the system 100*c* represents an exemplary branded fares mapping solution process flow in which airline contributed brand data 101*c*-1 (e.g., Main Cabin (Economy), Economy+, Basic Economy) processed to develop individual airline brand mapping via contributed brand mapping references from the participating airlines 107*c* and carrier contributed ticketing data 101*c*-2 processed by a first AI model 103*c* trained to identify patterns and generate mapping references for non-contributing airline brands 103*c*, 105*c* are both input to a second AI model 109*c* trained to collect and produce brand amenities information associated with each airline brand, scrubbing and fine-tuning output 111*c*, processing to create smart benchmarking groups across global airlines brands 113*c*, applying indexing for benchmarking 115*c*, to obtain a first output as a supplemental feature 117*c*-1 and a second output with another product 117*c*-2. Brand data can include baggage information (e.g., two free checked bags), refundability information (e.g., refundable), carry-on information (e.g., one carry on item and one personal item), flexibility information (e.g., free changes), Wi-Fi information (e.g., complementary, paid plans).

Figure 2:
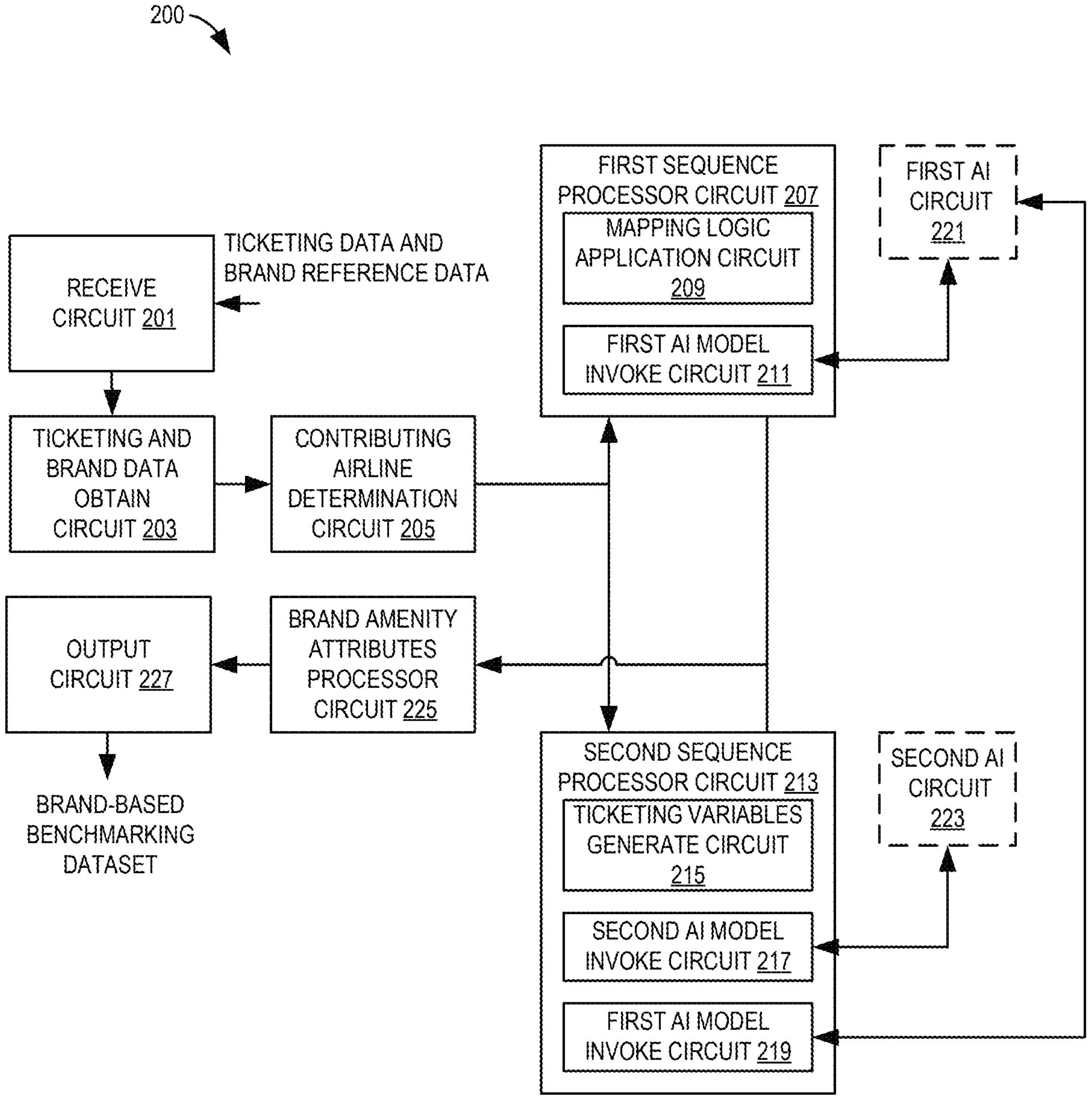
FIG. 2 illustrates one embodiment of a network node device in accordance with various aspects as described herein.

FIG. 2 illustrates one embodiment of a network node device 200 in accordance with various aspects as described herein. In FIG. 2, the device 200 implements various functional means, units, or modules (e.g., via the processing circuitry 301 in FIG. 3, via the processing circuitry 501 in FIG. 5, via software code, or the like), or circuits. In one embodiment, these functional means, units, modules, or circuits (e.g., for implementing the method(s) described herein) may include for instance: a receive circuitry 201 operable to receive information such as ticketing data and brand reference data; a ticketing data and brand data obtain circuit 203 operable to obtain ticketing data and brand reference data from a set of airline network node devices, with the ticketing data including fare basis information and the brand reference data including airline contributed brand identifiers; a contributing airline determination circuit 205 operable to determine whether a certain airline corresponding to one of the set of airline network node devices is a contributing airline that provides brand reference data or a non-contributing airline that does not provide brand reference data; a first processing sequence processor circuit 207 operable to execute a first processing sequence; a mapping logic application circuit 209 operable to apply mapping logic to assign an airline brand to ticketing data associated with the contributing airline; a first AI model invoke circuit 211 operable to invoke a first AI model trained to identify and associate brand amenity attributes with the assigned airline brand based on the ticketing data associated with the contributing airline, to obtain brand amenity attributes associated with the assigned airline brand; a second processing sequence processor circuit 213 operable to execute a second processing sequence; a ticketing-related variables generate circuit 215 operable to generate a set of ticketing-related variables from the ticketing data associated with the non-contributing airline; a second AI model invoke circuit 217 operable to invoke a second AI model trained to infer an airline brand based on the set of ticketing-related variables; a first AI model invoke circuit 219 operable to invoke the first AI model to obtain brand amenity attributes associated with the inferred airline brand; a first AI circuit 221 operable to execute a first AI model; a second AI circuit 223 operable to execute a second AI model; a brand amenity attributes processor circuit 225 operable to process the brand amenity attributes associated with the assigned and inferred airline brands through a multidimensional clustering algorithm based on mixed numerical and categorical similarity metrics to obtain benchmark groups of airline brands and corresponding benchmark data; an output circuit 227 operable to output a brand-based benchmarking dataset derived from the benchmark groups of airline brands and the corresponding benchmark data; or the like.

Figure 3:
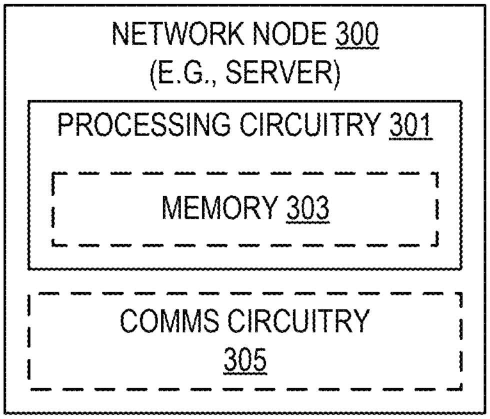
FIG. 3 illustrates another embodiment of a network node device in accordance with various aspects as described herein.

FIG. 3 illustrates another embodiment of a network node device 300 in accordance with various aspects as described herein. As shown, the device 300 includes processing circuitry 301 and communication circuitry 305 (e.g., network interface circuitry). The communication circuitry 305 is configured to transmit or receive information to or from one or more other nodes (e.g., via any communication technology). The processing circuitry 301 is configured to perform processing described above, such as by executing instructions stored in memory 303. The processing circuitry 301 in this regard may implement certain functional means, units, or modules.

Figure 4A:
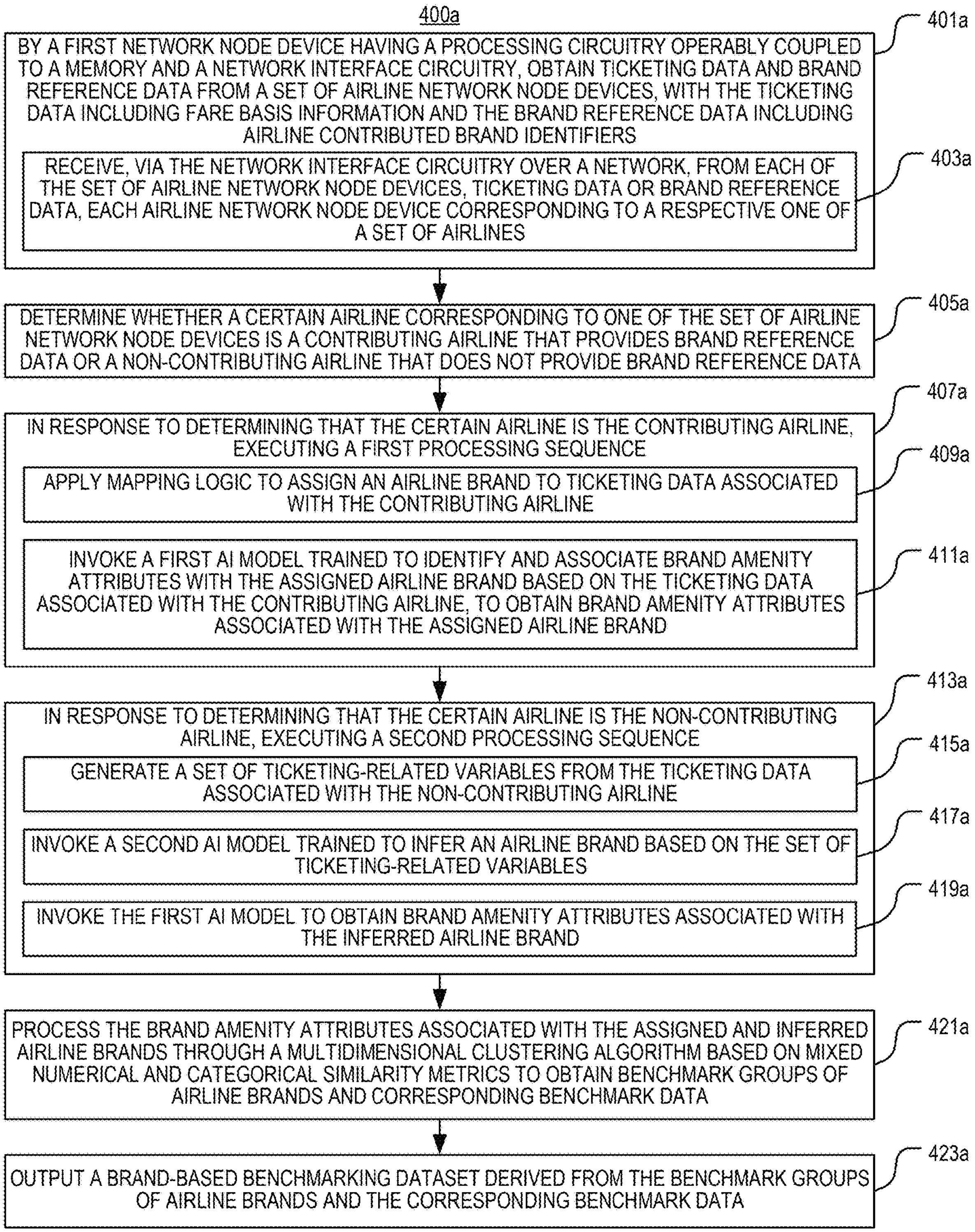
FIG. 4A illustrates one embodiment of a method performed by a network node device of airline seat brand identification and fare grouping in accordance with various aspects as described herein.

FIG. 4A illustrates one embodiment of a method 400*a* performed by a network node device of airline seat brand identification and fare grouping in accordance with various aspects as described herein. In FIG. 4A, the method 400*a* may start, for instance, at block 401*a* where it may include obtain ticketing data and brand reference data from a set of airline network node devices, with the ticketing data including fare basis information and the brand reference data including airline contributed brand identifiers. At block 403*a*, the method 400*a* can include receiving, via the network interface circuitry over a network, from each of the set of airline network node devices, ticketing data or brand reference data, each airline network node device corresponding to a respective one of a set of airlines. At block 405*a*, the method 400*a* can include determining whether a certain airline corresponding to one of the set of airline network node devices is a contributing airline that provides brand reference data or a non-contributing airline that does not provide brand reference data.

In FIG. 4A, at block 407*a*, the method 400*a* can include, in response to determining that the certain airline is the contributing airline, executing a first processing sequence, including applying mapping logic to assign an airline brand to ticketing data associated with the contributing airline (as referenced by block 409*a*) and invoking a first AI model trained to identify and associate brand amenity attributes with the assigned airline brand based on the ticketing data associated with the contributing airline, to obtain brand amenity attributes associated with the assigned airline brand (as referenced by block 411*a*). At block 413*a*, the method 400*a* can include, in response to determining that the certain airline is the non-contributing airline, executing a second processing sequence, including generating a set of ticketing-related variables from the ticketing data associated with the non-contributing airline (as referenced by block 415*a*), invoking a second AI model trained to infer an airline brand based on the set of ticketing-related variables (as referenced by block 417*a*), and invoking the first AI model to obtain brand amenity attributes associated with the inferred airline brand (as referenced by block 419*a*).

Furthermore, at block 421*a*, the method 400*a* can include processing the brand amenity attributes associated with the assigned and inferred airline brands through a multidimensional clustering algorithm based on mixed numerical and categorical similarity metrics to obtain benchmark groups of airline brands and corresponding benchmark data. At block 423*a*, the method 400*a* can include outputting a brand-based benchmarking dataset derived from the benchmark groups of airline brands and the corresponding benchmark data.

Figure 4B:
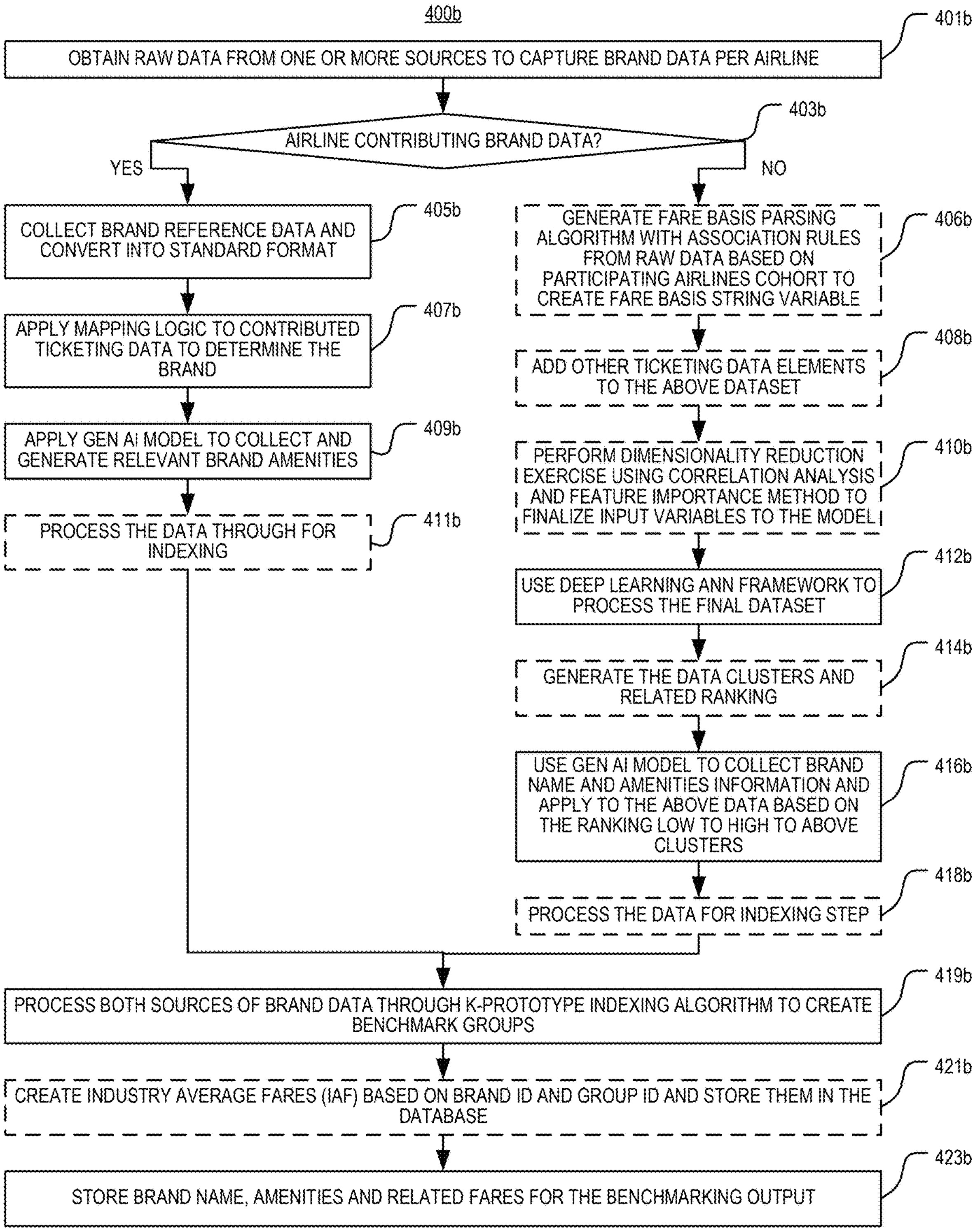
FIG. 4B illustrates another embodiment of a method performed by a network node device of airline seat brand identification and fare grouping in accordance with various aspects as described herein.

FIG. 4B illustrates another embodiment of a method 400*b* performed by a network node device of airline seat brand identification and fare grouping in accordance with various aspects as described herein. In FIG. 4B, the method 400*b* may start, for instance, at block 401*b* where it may include obtaining raw data from one or more sources to capture brand data per airline. At block 403*b*, the method 400*b* can include determining whether an airline contributes brand data. If yes, the method 400*b* can include: collecting brand reference data and convert into standard format (see reference block 405*b*); applying mapping logic to contributed ticketing data to determine the brand (see reference block 407*b*); applying Gen AI model to collect and generate relevant brand amenities (see reference block 409*b*); processing the data through for indexing (see reference block 411*b*); or the like.

Furthermore, if no, the method 400*b* can include: generating fare basis parsing algorithm with association rules from raw data based on participating airlines cohort to create fare basis string variable (see reference block 406*b*); adding other ticketing data elements to the above dataset (see reference block 408*b*); performing dimensionality reduction exercise using correlation analysis and feature importance method to finalize input variables to the model (see reference block 410*b*); using deep learning ANN framework to process the final dataset (see reference 412*b*); generating the data clusters and related ranking (see reference block 414*b*); using Gen AI model to collect brand name and amenities information and apply to the above data based on the ranking low to high to above clusters (see reference block 416*b*); processing the data for the indexing step (see reference block 418*b*); or the like.

In FIG. 4B, the method 400*b* can include processing both sources of brand data through k-prototype indexing algorithm to create benchmark groups, as referenced by block 419*b*. At block 421*b*, the method 400*b* can include processing both sources of brand data through k-prototype indexing algorithm to create benchmark groups. At block 423*b*, the method 400*b* can include processing both sources of brand data through k-prototype indexing algorithm to create benchmark groups.

FIG. 5 illustrates another embodiment of a network node device 500 in accordance with various aspects as described herein. In FIG. 5, device 500 includes processing circuitry 501 that is operatively coupled to input/output interface 505, artificial intelligence circuitry 509, network interface circuitry 511, power source 513, memory 515 including random access memory (RAM) 517, read-only memory (ROM) 519, and storage medium 521 or the like, communication subsystem 531, or any other component, or any combination thereof.

The input/output interface 505 may be configured to provide a communication interface to an input device, output device, or input and output device. The device 500 may be configured to use an input/output device via input/output interface 505 such as the location device (e.g., GPS module) and the display device (e.g., touchscreen). An output device may use the same type of interface port as an input device. For example, a USB port may be used to provide input to and output from the device 500. The output device may be a speaker, a sound card, a video card, a display, a monitor, a printer, an actuator, an emitter, a smartcard, another output device, or any combination thereof. The device 500 may be configured to use an input device via input/output interface 505 to allow a user to capture information into the device 500. The input device may include a touch-sensitive or presence-sensitive display, an optical sensor (e.g., a digital camera, a digital video camera, a web camera, etc.), a location device, a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical or image sensor, an infrared sensor, a proximity sensor, another like sensor, or any combination thereof.

In FIG. 5, storage medium 521 may include operating system 523, application program 525, data 527, the like, or any combination thereof. In other embodiments, storage medium 521 may include other similar types of information. Certain devices may utilize all of the components shown in FIG. 5, or only a subset of the components. The level of integration between the components may vary from one device to another device. Further, certain devices may contain multiple instances of a component, such as multiple processors, memories, neural networks, network connection interfaces, transceivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In FIG. 5, the AI circuitry 509 may be configured to learn to perform tasks by considering examples. For instance, the AI circuitry 509 can include one or more specialized AI processing subsystems or modules that are operable to execute different AI models used for brand identification and amenity association. For example, the AI circuitry 509 can include first AI circuitry operable to execute a first AI model trained to identify and associate brand amenity attributes with assigned or inferred airline brands, and/or a second AI circuitry operable to execute a second AI model trained to infer airline brands from ticketing-related variables when explicit brand reference data is unavailable. The first and second AI circuitry may be implemented as distinct physical accelerators (e.g., GPUs, NPUs, or TPUs), as virtualized AI containers executed by shared AI hardware, or as a combination thereof. In one example, the first AI circuitry may implement a generative AI framework trained on structured and unstructured airline product data to determine brand amenity attributes, while the second AI circuitry may implement a deep-learning neural-network framework trained on fare-basis codes, cabin indicators, or ticket designators to infer brand identifiers. The AI circuitry 509 may thus operate cooperatively with the processing circuitry 501 and the memory 515 to perform both the first and second processing sequences described herein and to generate the benchmark datasets associated with airline brand identification and fare grouping operations.

The network interface circuitry 511 may be configured to provide a communication interface to network 543*a*. The network 543*a* may encompass wired or wireless networks such as a local-area network (LAN), a wide-area network (WAN), a computer network, a wireless network, a telecommunications network, another like network or any combination thereof. For example, network 543*a* may comprise a Wi-Fi network. The network interface circuitry 511 may be configured to include a receiver and a transmitter interface used to communicate with one or more other devices over a communication network according to one or more communication protocols, such as Ethernet, TCP/IP, SONET, ATM, or the like. The network interface circuitry 511 may implement receiver and transmitter functionality appropriate to the communication network links (e.g., optical, electrical, and the like). The transmitter and receiver functions may share circuitry components, software or firmware, or alternatively may be implemented separately.

The RAM 517 may be configured to interface via a bus 503 to the processing circuitry 501 to provide storage or caching of data or computer instructions during the execution of software programs such as the operating system, application programs, and device drivers. The ROM 519 may be configured to provide computer instructions or data to processing circuitry 501. For example, the ROM 519 may be configured to store invariant low-level system code or data for basic system functions such as basic input and output (I/O), startup, or reception of keystrokes from a keyboard that are stored in a non-volatile memory. The storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium 521 may be configured to include an operating system 523, an application program 525 such as web browser, web application, user interface, browser data manager as described herein, a widget or gadget engine, or another application, and a data file 527. The storage medium 521 may store, for use by the device 500, any of a variety of various operating systems or combinations of operating systems.

The storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The storage medium 521 may allow the device 500*a-b* to access computer-executable instructions, application programs or the like, stored on transitory or non-transitory memory media, to off-load data, or to upload data. An article of manufacture, such as one utilizing a communication system may be tangibly embodied in the storage medium 521, which may comprise a device readable medium.

The processing circuitry 501 may be configured to communicate with network 543*b* using the communication subsystem 531. The network 543*a* and the network 543*b* may be the same network or networks or different network or networks. The communication subsystem 531 may be configured to include one or more transceivers used to communicate with the network 543*b*. For example, the communication subsystem 531 may be configured to include one or more transceivers used to communicate with one or more remote transceivers of another device capable of wireless communication according to one or more communication protocols, such as IEEE 802.11, CDMA, WCDMA, GSM, LTE, UTRAN, WiMax, or the like. Each transceiver may include transmitter 533 or receiver 535 to implement transmitter or receiver functionality, respectively, appropriate to the RAN links (e.g., frequency allocations and the like). Further, transmitter 533 and receiver 535 of each transceiver may share circuitry components, software, or firmware, or alternatively may be implemented separately.

In FIG. 5, the communication functions of the communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 531 may include cellular communication, Wi-Fi communication, Bluetooth communication, and GPS communication. The network 543*b* may encompass wired or wireless networks such as a local-area network (LAN), a wide-area network (WAN), a computer network, a wireless network, a telecommunications network, another like network or any combination thereof. For example, the network 543*b* may be a cellular network, a Wi-Fi network, or a near-field network. The power source 513 may be configured to provide alternating current (AC) or direct current (DC) power to components of the device 500*a-b*.

The features, benefits or functions described herein may be implemented in one of the components of the device 500 or partitioned across multiple components of the device 500. Further, the features, benefits, or functions described herein may be implemented in any combination of hardware, software, or firmware. In one example, communication subsystem 531 may be configured to include any of the components described herein. Further, the processing circuitry 501 may be configured to communicate with any of such components over the bus 503. In another example, any of such components may be represented by program instructions stored in memory that when executed by the processing circuitry 501 perform the corresponding functions described herein. In another example, the functionality of any of such components may be partitioned between the processing circuitry 501 and the communication subsystem 531. In another example, the non-computationally intensive functions of any of such components may be implemented in software or firmware and the computationally intensive functions may be implemented in hardware.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts for illustrative purposes, but the embodiments are similarly applicable in other contexts not explicitly described.

In one exemplary embodiment, a method is provided and performed by a first network node device having processing circuitry operatively coupled to memory and network interface circuitry. The first network node device is communicatively coupled, via the network interface circuitry over a network, to a set of airline network node devices, each corresponding to a respective one of a set of airlines. The method includes receiving, via the network interface circuitry over the network, from each of the set of airline network node devices, ticketing data or brand reference data, with the ticketing data including fare-basis information and the brand reference data including airline-contributed brand identifiers. The method further includes determining whether a certain airline corresponding to one of the set of airline network node devices is a contributing airline that provides brand reference data or a non-contributing airline that does not provide the brand reference data. In response to determining that the certain airline is the contributing airline, the method executes a first processing sequence that includes applying mapping logic to assign an airline brand to ticketing data associated with the contributing airline and invoking a first artificial-intelligence (AI) model trained to identify and associate brand amenity attributes with the assigned airline brand based on the ticketing data associated with the contributing airline, to obtain brand amenity attributes associated with the assigned airline brand. In response to determining that the certain airline is the non-contributing airline, the method executes a second processing sequence that includes generating a set of ticketing-related variables from the ticketing data associated with the non-contributing airline, invoking a second AI model trained to infer an airline brand based on the set of ticketing-related variables, and invoking the first AI model to obtain brand amenity attributes associated with the inferred airline brand. The method further processes the brand amenity attributes associated with the assigned and inferred airline brands generated in the respective first and second processing sequences through a multidimensional clustering algorithm based on mixed numerical and categorical similarity metrics to obtain benchmark groups of airline brands and corresponding benchmark data, and outputs a brand-based benchmarking dataset derived from the benchmark groups of airline brands and the corresponding benchmark data.

In another exemplary embodiment, the step of invoking the first AI model includes sending, via the network interface circuitry over the network, to a first AI network node device that is operable to execute the first AI model, the ticketing data associated with the contributing airline; receiving, via the network interface circuitry over the network, from the first AI network node device, the set of brand amenity attributes generated by execution of the first AI model based on the ticketing data associated with the contributing airline; and associating the received brand amenity attributes with the assigned airline brand.

In another exemplary embodiment, the step of invoking the first AI model includes sending, by the processing circuitry, to first AI circuitry of the first network node device that is operable to execute the first AI model, the ticketing data associated with the contributing airline; executing, by the first AI circuitry, the first AI model to generate the set of brand amenity attributes based on the ticketing data associated with the contributing airline; and receiving, by the processing circuitry, from the first AI circuitry, the generated brand amenity attributes, and associating the received brand amenity attributes with the assigned airline brand.

In another exemplary embodiment, the first AI model comprises a generative AI model trained on textual or structured airline product descriptions to identify brand amenity attributes including at least one of baggage allowance, refundability, seat selection capability, upgrade eligibility, or change-fee flexibility.

In another exemplary embodiment, the step of invoking the second AI model includes sending, via the network interface circuitry over the network, to a second AI network node device that is operable to execute the second AI model, the set of ticketing-related variables; and receiving, via the network interface circuitry over the network, from the second AI network node device, the inferred airline brand generated by execution of the second AI model based on the set of ticketing-related variables.

In another exemplary embodiment, the step of invoking the second AI model includes sending, by the processing circuitry, to second AI circuitry of the first network node device that is operable to execute the second AI model, the set of ticketing-related variables; executing, by the second AI circuitry, the second AI model to generate the inferred airline brand based on the set of ticketing-related variables; and receiving, by the processing circuitry, from the second AI circuitry, the inferred airline brand.

In another exemplary embodiment, the second AI model comprises a deep-learning neural-network model trained on ticketing-related variables including at least one of fare-basis codes, cabin indicators, ticket designators, carrier codes, or route characteristics, to infer the airline brand.

In another exemplary embodiment, the method further includes storing, in the memory, intermediate datasets generated by the first and second processing sequences, including assigned and inferred airline brands and the corresponding brand amenity attributes, prior to processing by the multidimensional clustering algorithm.

In another exemplary embodiment, the multidimensional clustering algorithm comprises a hybrid clustering algorithm that applies k-prototype or k-means clustering to mixed numerical and categorical variables representing the brand amenity attributes and fare-related data.

In another exemplary embodiment, the method further includes ranking the benchmark groups of airline brands based on aggregated fare values or average amenity-value scores to produce an ordered brand-based benchmarking dataset.

In another exemplary embodiment, the method further includes generating, by at least one of the first AI model or the second AI model, a confidence score or feature-importance metric identifying one or more variables that contributed to the corresponding brand or amenity inference. In this embodiment, the first network node device may record, in association with each inferred airline brand or determined brand-amenity attribute, an explanation dataset that includes model-specific interpretability information such as a feature weight vector, token attribution map, or normalized probability value that reflects the relative influence of the ticketing-related variables or brand reference inputs on the resulting prediction. The resulting confidence score or feature-importance metric may be stored together with the brand-based benchmarking dataset to enable traceability, interpretability, and validation of the underlying AI-driven brand identification process.

In another exemplary embodiment, the multidimensional clustering algorithm is implemented as an adaptive clustering framework configured to dynamically select among multiple clustering techniques based on validation metrics computed from the processed brand-amenity attributes and fare-related data. In one example, the adaptive clustering framework may evaluate internal performance indices such as silhouette coefficients, Davies-Bouldin indices, or Calinski-Harabasz scores to determine whether k-prototype, hierarchical agglomerative, or Gaussian-mixture clustering provides the optimal representation of airline brand similarity. The system may then apply the selected clustering technique to generate benchmark groups of airline brands and corresponding benchmark data, thereby improving the precision and stability of the resulting brand-based benchmarking dataset compared with systems using static or pre-selected clustering algorithms.

In one exemplary embodiment, a first network node device is provided. The first network node device includes processing circuitry operatively coupled to memory and network interface circuitry, the network interface circuitry being configured to communicatively couple the first network node device, over a network, to a set of airline network node devices, each airline network node device corresponding to a respective one of a set of airlines. The memory stores instructions that, when executed by the processing circuitry, cause the processing circuitry to receive, via the network interface circuitry, from each of the set of airline network node devices, ticketing data or brand reference data, the ticketing data including fare-basis information and the brand reference data including airline-contributed brand identifiers. The instructions further cause the processing circuitry to determine whether a certain airline corresponding to one of the set of airline network node devices is a contributing airline that provides the brand reference data or a non-contributing airline that does not provide the brand reference data. In response to determining that the certain airline is the contributing airline, the processing circuitry executes a first processing sequence including applying mapping logic to assign an airline brand to ticketing data associated with the contributing airline and invoking a first artificial-intelligence (AI) model trained to identify and associate brand amenity attributes with the assigned airline brand based on the ticketing data associated with the contributing airline to obtain brand amenity attributes associated with the assigned airline brand. In response to determining that the certain airline is the non-contributing airline, the processing circuitry executes a second processing sequence including generating a set of ticketing-related variables from the ticketing data associated with the non-contributing airline, invoking a second AI model trained to infer an airline brand based on the set of ticketing-related variables, and invoking the first AI model to obtain brand amenity attributes associated with the inferred airline brand. The processing circuitry then processes the brand amenity attributes associated with the assigned and inferred airline brands generated in the respective first and second processing sequences through a multidimensional clustering algorithm based on mixed numerical and categorical similarity metrics to obtain benchmark groups of airline brands and corresponding benchmark data, and outputs, via the network interface circuitry, a brand-based benchmarking dataset derived from the benchmark groups of airline brands and the corresponding benchmark data.

In another exemplary embodiment, the instructions further cause the processing circuitry to send, via the network interface circuitry over the network, to a first AI network node device that is operable to execute the first AI model, the ticketing data associated with the contributing airline; receive, via the network interface circuitry over the network, from the first AI network node device, the set of brand amenity attributes generated by execution of the first AI model based on the ticketing data associated with the contributing airline; and associate the received brand amenity attributes with the assigned airline brand.

In another exemplary embodiment, the instructions further cause the processing circuitry to send, by the processing circuitry, to first AI circuitry of the first network node device that is operable to execute the first AI model, the ticketing data associated with the contributing airline; execute, by the first AI circuitry, the first AI model to generate the set of brand amenity attributes based on the ticketing data associated with the contributing airline; receive, from the first AI circuitry, the generated brand amenity attributes; and associate the received brand amenity attributes with the assigned airline brand.

In another exemplary embodiment, the instructions further cause the processing circuitry to send, via the network interface circuitry over the network, to a second AI network node device that is operable to execute the second AI model, the set of ticketing-related variables; and receive, via the network interface circuitry over the network, from the second AI network node device, the inferred airline brand generated by execution of the second AI model based on the set of ticketing-related variables.

In another exemplary embodiment, the instructions further cause the processing circuitry to send, by the processing circuitry, to second AI circuitry of the first network node device that is operable to execute the second AI model, the set of ticketing-related variables; execute, by the second AI circuitry, the second AI model to generate the inferred airline brand based on the set of ticketing-related variables; and receive, by the processing circuitry, from the second AI circuitry, the inferred airline brand.

In another exemplary embodiment, the instructions further cause the processing circuitry to store, in the memory, intermediate datasets generated by the first and second processing sequences, including assigned and inferred airline brands and the corresponding brand amenity attributes, prior to processing by the multidimensional clustering algorithm.

In one exemplary embodiment, a system is provided for airline brand identification and benchmarking. The system includes a set of airline network node devices, each configured to communicate over a network and to provide to the network one or more of ticketing data or brand reference data, with the ticketing data including fare-basis information and the brand reference data including airline-contributed brand identifiers. The system further includes a first network node device having processing circuitry operatively coupled to memory and network interface circuitry, the network interface circuitry being configured to communicatively couple the first network node device to the set of airline network node devices over the network. The memory stores instructions that, when executed by the processing circuitry, cause the processing circuitry to receive, via the network interface circuitry, from each of the set of airline network node devices, the ticketing data or the brand reference data; determine whether a certain airline corresponding to one of the set of airline network node devices is a contributing airline that provides the brand reference data or a non-contributing airline that does not provide the brand reference data; and, in response to determining that the certain airline is the contributing airline, execute a first processing sequence including applying mapping logic to assign an airline brand to ticketing data associated with the contributing airline and invoking a first artificial-intelligence (AI) model trained to identify and associate brand amenity attributes with the assigned airline brand based on the ticketing data associated with the contributing airline to obtain brand amenity attributes associated with the assigned airline brand. In response to determining that the certain airline is the non-contributing airline, the processing circuitry executes a second processing sequence including generating a set of ticketing-related variables from ticketing data associated with the non-contributing airline, invoking a second AI model trained to infer an airline brand based on the set of ticketing-related variables, and invoking the first AI model to obtain brand amenity attributes associated with the inferred airline brand. The processing circuitry further processes the brand amenity attributes associated with the assigned and inferred airline brands generated in the respective first and second processing sequences through a multidimensional clustering algorithm based on mixed numerical and categorical similarity metrics to obtain benchmark groups of airline brands and corresponding benchmark data, and outputs, via the network interface circuitry, a brand-based benchmarking dataset derived from the benchmark groups of airline brands and the corresponding benchmark data.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method performed by a first network node device having processing circuitry operatively coupled to memory and network interface circuitry, the first network node device being communicatively coupled via the network interface circuitry over a network to a set of airline network node devices, each airline network node device comprising computing infrastructure corresponding to a respective one of a set of airlines, wherein the set of airlines includes at least one contributing airline and at least one non-contributing airline, the method comprising:

receiving, via the network interface circuitry over the network, from the set of airline network node devices, in accordance with standardized transport protocols or secure message queues, ticketing data from each of the set of airline network node devices and brand reference data from one or more contributing airline network node devices of the set of airline network node devices, with the ticketing data including structured ticketing records having fare basis information, routing identifiers, booking class codes, cabin designators, or ancillary attributes, and the brand reference data including airline supplied brand definitions or airline contributed brand identifiers that associate a fare or product with a branded fare family;

determining, for each respective airline of the set of airlines, whether the respective airline corresponding to one of the set of airline network node devices is a contributing airline that provides brand reference data or a non-contributing airline that does not provide the brand reference data;

in response to determining that the respective airline is the contributing airline, executing a first processing sequence, including converting the brand reference data associated with the contributing airline into standardized brand reference records, applying mapping logic, based on the standardized brand reference records maintained in the memory of the first network node device, to assign a standardized airline brand identifier to ticketing data associated with the contributing airline based on at least one airline contributed brand identifier and fare basis information, and invoking a first artificial intelligence (AI) model executed by first AI circuitry of the first network node device or one or more AI network node devices, wherein the first AI model includes a generative AI model or semantic numerical representation AI model trained on airline or travel commerce datasets to identify brand amenity attributes missing from the brand reference data and the ticketing data and associate the brand amenity attributes with the assigned standardized airline brand identifier based on the ticketing data associated with the contributing airline, wherein invoking the first AI model includes providing, to the first AI model, a first AI invocation indication including the assigned standardized airline brand identifier and receiving a first AI result indication including a structured brand amenity feature vector including brand amenity attributes associated with the assigned standardized airline brand identifier, the structured brand amenity feature vector including categorical fields corresponding to baggage allowance, refundability, seat selection capability, upgrade eligibility, or change fee flexibility;

in response to determining that the respective airline is the non-contributing airline, executing a second processing sequence, including generating a set of ticketing-related variables from the ticketing data associated with the non-contributing airline by parsing fare basis strings using association rules derived from ticketing data received from the set of airline network node devices and selecting input variables using correlation analysis and feature importance processing to form a finalized model input vector including a fare basis string variable and one or more of a route pattern, carrier code, cabin indicator, ticket designator, or fare-related value, invoking a second AI model executed by second AI circuitry of the first network node device or the one or more AI network node devices, wherein the second AI model includes a deep learning neural network model trained, based on labeled brand examples derived from contributing airlines or other training sources, to infer an airline brand based on the set of ticketing-related variables to generate an inferred airline brand identifier missing from the brand reference data and the ticketing data and a confidence score or feature importance metric, wherein invoking the second AI model includes transmitting a second AI invocation indication including the finalized model input vector and receiving a second AI result indication including the inferred airline brand identifier and the confidence score or feature importance metric, and invoking the first AI model to obtain a structured brand amenity feature vector including brand amenity attributes associated with the inferred airline brand identifier;

processing the structured brand amenity feature vectors associated with the assigned standardized airline brand identifiers and the inferred airline brand identifiers generated in the respective first and second processing sequences through a multidimensional clustering algorithm based on mixed numerical and categorical similarity metrics by generating a mixed-type feature matrix including categorical brand amenity attributes and numerical fare-related values and applying the multidimensional clustering algorithm or, by an adaptive mixed-type clustering framework, selecting and applying one of a plurality of mixed-type clustering techniques based on one or more clustering validation metrics to obtain benchmark groups of airline brands and corresponding benchmark data; and outputting a brand-based benchmarking dataset derived from the benchmark groups of airline brands and the corresponding benchmark data, wherein the brand-based benchmarking dataset includes structured records stored in the memory or transmitted via the network interface circuitry, the structured records being formatted as JSON records or relational database records for delivery to at least one airline network node device, a downstream analytical system, visualization dashboard, or reporting application, the structured records identifying, for each assigned standardized airline brand identifier and each inferred airline brand identifier, at least a benchmark group assignment, a relative position score, an average fare to amenity ratio, and, for each structured record associated with an inferred airline brand identifier, the confidence score or feature importance metric.

2. The method of claim 1, wherein the step of invoking the first AI model comprises:

sending, via the network interface circuitry over the network, to a first AI network node device that is operable to execute the first AI model, the first AI invocation indication including the assigned standardized airline brand identifier;

receiving, via the network interface circuitry over the network, from the first AI network node device, the first AI result indication including the structured brand amenity feature vector; and associating the received structured brand amenity feature vector with the assigned standardized airline brand identifier.

3. The method of claim 1, wherein the step of invoking the first AI model comprises:

sending, by the processing circuitry, to first AI circuitry of the first network node device that is operable to execute the first AI model, the first AI invocation indication including the assigned standardized airline brand identifier;

executing, by the first AI circuitry, the first AI model to generate the first AI result indication including the structured brand amenity feature vector;

receiving, by the processing circuitry, from the first AI circuitry, the generated structured brand amenity feature vector; and associating the received structured brand amenity feature vector with the assigned standardized airline brand identifier.

4. The method of claim 1, wherein the first AI model comprises a generative AI model trained on textual or structured airline product descriptions to identify the brand amenity attributes including at least one of baggage allowance, refundability, seat selection capability, upgrade eligibility, or change fee flexibility and to output the structured brand amenity feature vector.

5. The method of claim 1, wherein the step of invoking the second AI model comprises:

sending, via the network interface circuitry over the network, to a second AI network node device that is operable to execute the second AI model, the second AI invocation indication including the finalized model input vector; and receiving, via the network interface circuitry over the network, from the second AI network node device, the second AI result indication including the inferred airline brand identifier and the confidence score or feature importance metric.

6. The method of claim 1, wherein the step of invoking the second AI model comprises:

sending, by the processing circuitry, to second AI circuitry of the first network node device that is operable to execute the second AI model, the second AI invocation indication including the finalized model input vector;

executing, by the second AI circuitry, the second AI model to generate the second AI result indication including the inferred airline brand identifier and the confidence score or feature importance metric; and receiving, by the processing circuitry, from the second AI circuitry, the second AI result indication.

7. The method of claim 1, wherein the second AI model comprises a deep learning neural network model trained on finalized model input vectors including at least one of fare basis string variables, cabin indicators, ticket designators, carrier codes, route characteristics, or fare-related values, to infer the inferred airline brand identifier.

8. The method of claim 1, further comprising:

storing, in the memory, intermediate datasets generated by the first and second processing sequences including assigned standardized airline brand identifiers, inferred airline brand identifiers, finalized model input vectors, structured brand amenity feature vectors, and confidence scores or feature importance metrics prior to processing by the multidimensional clustering algorithm.

9. The method of claim 1, wherein the multidimensional clustering algorithm comprises a hybrid clustering algorithm that applies k-prototype clustering or the adaptive mixed-type clustering framework to mixed numerical and categorical variables representing the structured brand amenity feature vectors and the numerical fare-related values.

10. The method of claim 1, further comprising:

storing, in association with the brand-based benchmarking dataset, an explanation dataset including the confidence score or feature importance metric for each inferred airline brand identifier.

11. A first network node device, comprising:

processing circuitry operatively coupled to memory and network interface circuitry, the network interface circuitry being configured to communicatively couple the first network node device, over a network, to a set of airline network node devices, each airline network node device comprising computing infrastructure corresponding to a respective one of a set of airlines, wherein the set of airlines includes at least one contributing airline and at least one non-contributing airline;

wherein the memory stores instructions that, when executed by the processing circuitry, cause the processing circuitry to:

receive, via the network interface circuitry, from the set of airline network node devices, in accordance with standardized transport protocols or secure message queues, ticketing data from each of the set of airline network node devices and brand reference data from one or more contributing airline network node devices of the set of airline network node devices, the ticketing data including structured ticketing records having fare basis information, routing identifiers, booking class codes, cabin designators, or ancillary attributes, and the brand reference data including airline supplied brand definitions or airline contributed brand identifiers that associate a fare or product with a branded fare family;

determine, for each respective airline of the set of airlines, whether the respective airline corresponding to one of the set of airline network node devices is a contributing airline that provides the brand reference data or a non-contributing airline that does not provide the brand reference data;

in response to determining that the respective airline is the contributing airline, execute a first processing sequence including converting the brand reference data associated with the contributing airline into standardized brand reference records, applying mapping logic, based on the standardized brand reference records maintained in the memory of the first network node device, to assign a standardized airline brand identifier to ticketing data associated with the contributing airline based on at least one airline contributed brand identifier and fare basis information, and invoking a first artificial intelligence (AI) model executed by first AI circuitry of the first network node device or one or more AI network node devices, wherein the first AI model includes a generative AI model or semantic numerical representation AI model trained on airline or travel commerce datasets to identify brand amenity attributes missing from the brand reference data and the ticketing data and associate the brand amenity attributes with the assigned standardized airline brand identifier based on the ticketing data associated with the contributing airline, wherein invoking the first AI model includes providing, to the first AI model, a first AI invocation indication including the assigned standardized airline brand identifier and receiving a first AI result indication including a structured brand amenity feature vector including brand amenity attributes associated with the assigned standardized airline brand identifier, the structured brand amenity feature vector including categorical fields corresponding to baggage allowance, refundability, seat selection capability, upgrade eligibility, or change fee flexibility;

in response to determining that the respective airline is the non-contributing airline, execute a second processing sequence including generating a set of ticketing-related variables from the ticketing data associated with the non-contributing airline by parsing fare basis strings using association rules derived from ticketing data received from the set of airline network node devices and selecting input variables using correlation analysis and feature importance processing to form a finalized model input vector including a fare basis string variable and one or more of a route pattern, carrier code, cabin indicator, ticket designator, or fare-related value, invoking a second AI model executed by second AI circuitry of the first network node device or the one or more AI network node devices, wherein the second AI model includes a deep learning neural network model trained, based on labeled brand examples derived from contributing airlines or other training sources, to infer an airline brand based on the set of ticketing-related variables to generate an inferred airline brand identifier missing from the brand reference data and the ticketing data and a confidence score or feature importance metric, wherein invoking the second AI model includes transmitting a second AI invocation indication including the finalized model input vector and receiving a second AI result indication including the inferred airline brand identifier and the confidence score or feature importance metric, and invoking the first AI model to obtain a structured brand amenity feature vector including brand amenity attributes associated with the inferred airline brand identifier;

process the structured brand amenity feature vectors associated with the assigned standardized airline brand identifiers and the inferred airline brand identifiers generated in the respective first and second processing sequences through a multidimensional clustering algorithm based on mixed numerical and categorical similarity metrics by generating a mixed-type feature matrix including categorical brand amenity attributes and numerical fare-related values and applying the multidimensional clustering algorithm or, by an adaptive mixed-type clustering framework, selecting and applying one of a plurality of mixed-type clustering techniques based on one or more clustering validation metrics to obtain benchmark groups of airline brands and corresponding benchmark data; and output, via the network interface circuitry, a brand-based benchmarking dataset derived from the benchmark groups of airline brands and the corresponding benchmark data, wherein the brand-based benchmarking dataset includes structured records stored in the memory or transmitted via the network interface circuitry, the structured records being formatted as JSON records or relational database records for delivery to at least one airline network node device, a downstream analytical system, visualization dashboard, or reporting application, the structured records identifying, for each assigned standardized airline brand identifier and each inferred airline brand identifier, at least a benchmark group assignment, a relative position score, an average fare to amenity ratio, and, for each structured record associated with an inferred airline brand identifier, the confidence score or feature importance metric.

12. The device of claim 11, wherein the instructions further cause the processing circuitry to:

send, via the network interface circuitry over the network, to a first AI network node device that is operable to execute the first AI model, the first AI invocation indication including the assigned standardized airline brand identifier;

receive, via the network interface circuitry over the network, from the first AI network node device, the first AI result indication including the structured brand amenity feature vector; and associate the received structured brand amenity feature vector with the assigned standardized airline brand identifier.

13. The device of claim 11, wherein the instructions further cause the processing circuitry to:

send, by the processing circuitry, to first AI circuitry of the first network node device that is operable to execute the first AI model, the first AI invocation indication including the assigned standardized airline brand identifier;

execute, by the first AI circuitry, the first AI model to generate the first AI result indication including the structured brand amenity feature vector;

receive, from the first AI circuitry, the generated structured brand amenity feature vector; and associate the received structured brand amenity feature vector with the assigned standardized airline brand identifier.

14. The device of claim 11, wherein the first AI model comprises a generative AI model trained on textual or structured airline product descriptions to identify the brand amenity attributes including at least one of baggage allowance, refundability, seat selection capability, upgrade eligibility, or change fee flexibility, and to output the structured brand amenity feature vector.

15. The device of claim 11, wherein the instructions further cause the processing circuitry to:

send, via the network interface circuitry over the network, to a second AI network node device that is operable to execute the second AI model, the second AI invocation indication including the finalized model input vector; and receive, via the network interface circuitry over the network, from the second AI network node device, the second AI result indication including the inferred airline brand identifier and the confidence score or feature importance metric.

16. The device of claim 11, wherein the instructions further cause the processing circuitry to:

send, to second AI circuitry of the first network node device that is operable to execute the second AI model, the second AI invocation indication including the finalized model input vector;

execute, by the second AI circuitry, the second AI model to generate the second AI result indication including the inferred airline brand identifier and the confidence score or feature importance metric; and receive, from the second AI circuitry, the second AI result indication.

17. The device of claim 11, wherein the second AI model comprises a deep learning neural network model trained on finalized model input vectors including at least one of fare basis string variables, cabin indicators, ticket designators, carrier codes, route characteristics, or fare-related values, to infer the inferred airline brand identifier.

18. The device of claim 11, wherein the instructions further cause the processing circuitry to:

store, in the memory, intermediate datasets generated by the first and second processing sequences including assigned standardized airline brand identifiers, inferred airline brand identifiers, finalized model input vectors, structured brand amenity feature vectors, and confidence scores or feature importance metrics prior to processing by the multidimensional clustering algorithm.

19. The device of claim 11, wherein the multidimensional clustering algorithm comprises a hybrid clustering algorithm that applies k-prototype clustering or the adaptive mixed-type clustering framework to mixed numerical and categorical variables representing the structured brand amenity feature vectors and the numerical fare-related values.

20. A system, comprising:

a set of airline network node devices, each configured to communicate over a network and to provide to the network ticketing data, wherein one or more contributing airline network node devices of the set of airline network node devices are further configured to provide brand reference data, the ticketing data including fare basis information and the brand reference data including airline contributed brand identifiers, each airline network node device comprising computing infrastructure corresponding to a respective one of a set of airlines, wherein the set of airlines includes at least one contributing airline and at least one non-contributing airline; and a first network node device including processing circuitry operatively coupled to memory and network interface circuitry, the network interface circuitry being configured to communicatively couple the first network no de device to the set of airline network node devices over the network;

wherein the memory stores instructions that, when executed by the processing circuitry, cause the processing circuitry to:

receive, via the network interface circuitry, from the set of airline network node devices, in accordance with standardized transport protocols or secure message queues, the ticketing data from each of the set of airline network node devices and the brand reference data from one or more contributing airline network node devices of the set of airline network node devices, the ticketing data including structured ticketing records having fare basis information, routing identifiers, booking class codes, cabin designators, or ancillary attributes, and the brand reference data including airline supplied brand definitions or airline contributed brand identifiers that associate a fare or product with a branded fare family;

determine, for each respective airline of the set of airlines, whether the respective airline corresponding to one of the set of airline network node devices is a contributing airline that provides the brand reference data or a non-contributing airline that does not provide the brand reference data;

in response to determining that the respective airline is the contributing airline, execute a first processing sequence including converting the brand reference data associated with the contributing airline into standardized brand reference records, applying mapping logic, based on the standardized brand reference records maintained in the memory of the first network node device, to assign a standardized airline brand identifier to ticketing data associated with the contributing airline based on at least one airline contributed brand identifier and fare basis information, and invoking a first artificial intelligence (AI) model executed by first AI circuitry of the first network node device or one or more AI network node devices, wherein the first AI model includes a generative AI model or semantic numerical representation AI model trained on airline or travel commerce datasets to identify brand amenity attributes missing from the brand reference data and the ticketing data and associate the brand amenity attributes with the assigned standardized airline brand identifier based on the ticketing data associated with the contributing airline, wherein invoking the first AI model includes providing, to the first AI model, a first AI invocation indication including the assigned standardized airline brand identifier and receiving a first AI result indication including a structured brand amenity feature vector including brand amenity attributes associated with the assigned standardized airline brand identifier, the structured brand amenity feature vector including categorical fields corresponding to baggage allowance, refundability, seat selection capability, upgrade eligibility, or change fee flexibility;

in response to determining that the respective airline is the non-contributing airline, execute a second processing sequence including generating a set of ticketing-related variables from ticketing data associated with the non-contributing airline by parsing fare basis strings using association rules derived from ticketing data received from the set of airline network node devices and selecting input variables using correlation analysis and feature importance processing to form a finalized model input vector including a fare basis string variable and one or more of a route pattern, carrier code, cabin indicator, ticket designator, or fare-related value, invoking a second AI model executed by second AI circuitry of the first network node device or the one or more AI network node devices, wherein the second AI model includes a deep learning neural network model trained, based on labeled brand examples derived from contributing airlines or other training sources, to infer an airline brand based on the set of ticketing-related variables to generate an inferred airline brand identifier missing from the brand reference data and the ticketing data and a confidence score or feature importance metric, wherein invoking the second AI model includes transmitting a second AI invocation indication including the finalized model input vector and receiving a second AI result indication including the inferred airline brand identifier and the confidence score or feature importance metric, and invoking the first AI model to obtain a structured brand amenity feature vector including brand amenity attributes associated with the inferred airline brand identifier;

process the structured brand amenity feature vectors associated with the assigned standardized airline brand identifiers and the inferred airline brand identifiers generated in the respective first and second processing sequences through a multidimensional clustering algorithm based on mixed numerical and categorical similarity metrics by generating a mixed-type feature matrix including categorical brand amenity attributes and numerical fare-related values and applying the multidimensional clustering algorithm or, by an adaptive mixed-type clustering framework, selecting and applying one of a plurality of mixed-type clustering techniques based on one or more clustering validation metrics to obtain benchmark groups of airline brands and corresponding benchmark data; and output, via the network interface circuitry, a brand-based benchmarking dataset derived from the benchmark groups of airline brands and the corresponding benchmark data, wherein the brand-based benchmarking dataset includes structured records stored in the memory or transmitted via the network interface circuitry, the structured records being formatted as JSON records or relational database records for delivery to at least one airline network node device, a downstream analytical system, visualization dashboard, or reporting application, the structured records identifying, for each assigned standardized airline brand identifier and each inferred airline brand identifier, at least a benchmark group assignment, a relative position score, an average fare to amenity ratio, and, for each structured record associated with an inferred airline brand identifier, the confidence score or feature importance metric.

* * * * *